US006552680B1

(12) United States Patent
Barber et al.

(10) Patent No.: US 6,552,680 B1
(45) Date of Patent: Apr. 22, 2003

(54) METHOD AND SYSTEM FOR MINIMIZING STORAGE AND PROCESSING OF IONOSPHERIC GRID POINT CORRECTION INFORMATION

(75) Inventors: Clayton Barber, Independence, MO (US); Cliff Pemble, Olathe, KS (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 09/969,698

(22) Filed: Oct. 1, 2001

(51) Int. Cl.[7] ............................................. H04B 7/185
(52) U.S. Cl. .............................. 342/357.02; 342/357.13
(58) Field of Search ........................ 342/357.02, 357.13

(56) References Cited

U.S. PATENT DOCUMENTS 5,621,646 A * 4/1997 Enge et al. ............ 342/357.03
5,828,336 A * 10/1998 Yunck et al. .......... 342/357.02
6,040,798 A * 3/2000 Kinal et al. ............ 342/357.01

OTHER PUBLICATIONS

The FAA Wide Area Differential GPS (WADGPS) Static Ionospheric Experiment, M.B. El–Arini et al., Institute of Navigation, National Technical Meeting Proceedings, "Evolution Through Integration of Current and Emerging Systems", 1993.*

Evaluation of the GPS Wide–Area Augmentation System (WAAS) Ionospheric Grid Algorithm During the Peak of the Current Solar Cycle, M.B. El–Arini et al, Institute of Navigation, National Technical Meeting Proceedings, "Navigating the Earth and Beyond", 1994.*

Flight Trials of the Wide–Area Augmentation Systm (WAAS), T. Walter et al., Institute of Navigation, ION GPS 1994, Sep. 1994.*

The application of a 3–D empirical ionosphere model to WAAS simulation, E.R. Peterson et al., IEEE Position Location and Navigation Symposium, p. 366–370, 1998.*

* cited by examiner

Primary Examiner—Thomas H. Tarcza
Assistant Examiner—Fred H Mull
(74) Attorney, Agent, or Firm—Devon A Rolf

(57) ABSTRACT

A method and system are provided for minimizing storage and processing of ionospheric grid point corrections transmitted from WAAS satellites in a global positioning system. Based upon a current location, the system creates a boundary around the current location and collects ionospheric grid point corrections within the boundary. The collected correction points are used to correct the position initially determined by a global positioning system.

31 Claims, 7 Drawing Sheets

| NORTHERNMOST LATITUDE BOUNDARY (202) | SOUTHERNMOST LATITUDE BOUNDARY (204) | NO. OF LATITUDES IN GRID (206) | LATITUDE INFORMATION ARRAY (208) | TOTAL NO. OF GRID CORRECTION ARRAY ENTRIES (210) |
|---|---|---|---|---|

| GRID POINT LATITUDE (214) | EASTERNMOST LONGITUDE (216) | WESTERNMOST LONGITUDE (218) | GRID CORRECTION ARRAY INDEX (220) | NO. OF GRID POINT CORRECTION ARRAY ENTRIES (222) |
|---|---|---|---|---|

| BAND 0 BOUNDARY INDICATOR (226) | BAND 1 BOUNDARY INDICATOR (228) | ... | BAND 10 BOUNDARY INDICATOR (230) |
|---|---|---|---|

METHOD AND SYSTEM FOR MINIMIZING STORAGE AND PROCESSING OF IONOSPHERIC GRID POINT CORRECTION INFORMATION

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates generally to a method, system and device for minimizing storage and processing of ionospheric grid point corrections transmitted from WAAS satellites and, more particularly, to such a method, system, and device that utilizes GPS location data and WAAS ionospheric grid point correction data to determine an optimal number of elements in a correction array utilizing a table-driven method for minimizing the number of ionospheric grid point corrections collected from the WAAS satellites.

BACKGROUND OF THE INVENTION

The Global Positioning System (GPS) is a worldwide radio-navigation system formed from a constellation of 24 satellites and corresponding ground stations. Each satellite continually broadcasts its location in space along with the current time from an internal clock. GPS receivers can determine their position to within a few meters by receiving and analyzing signals transmitted from the satellites. To determine its location, a GPS receiver scans for satellite signals until it has acquired signals from three or more satellites. Two-dimensional locations can be determined by analyzing signals from three satellites, and three-dimensional locations can be determined by analyzing signals from four or more satellites. A GPS receiver determines its location by determining its distance from the GPS satellites based on the received signals and then triangulating these distance measurements. Commercial GPS receivers can determine their locations to an accuracy of 10 meters or less with 95 percent reliability.

Although the current GPS has been successful, it has several shortcomings. For example, GPS satellite signals are subject to errors caused by ionospheric disturbances and satellite orbit discrepancies. Ionospheric and tropospheric refraction can slow satellite signals and cause carriers and codes to diverge. Because ionospheric disturbances vary greatly from location to location, these errors are difficult to correct with civilian-type GPS receivers.

To account for these errors, the FAA developed a Wide Area Augmentation System (WAAS) to improve the accuracy, availability and integrity of the GPS. The WAAS is based on a network of approximately 25 wide area ground reference stations (WRSs) that are linked to cover a service area including the entire U.S. and some areas of Canada and Mexico. Each of the WRSs has been precisely surveyed so that its exact location is known. Signals from GPS satellites are received and analyzed by the WRSs to determine errors in the signals, including errors caused by the ionospheric disturbances described above. Each WRS in the network relays its data to a wide area master station (WMS) where correction information is computed. The WMS calculates correction messages for each GPS satellite based on correction algorithms and assesses the overall integrity of the system. The correction messages are then uplinked to a pair of Geostationary Communication Satellites (GEOs) via a ground uplink system (GUS). The GEOs then broadcast the messages on the same frequency as GPS (L1, 1575.42 MHz) to GPS receivers within the coverage area of the WAAS. GPS receivers may then utilize the WAAS correction data to correct for GPS satellite signal errors caused by ionospheric disturbances and other inaccuracies. The communications satellites also act as additional navigation satellites for the GPS receivers, thus, providing additional navigation signals for position determination.

One type of information that is included in the correction messages from the GEOs is ionospheric correction data. Ionospheric corrections are broadcast for selected ionospheric grid points generally spaced at 5 degree intervals in both latitude and longitude directions. One approach is to store the correction points in a two dimensional array containing a total of 2,592 elements [(360 degrees longitude divided by 5 degrees) times (180 degrees latitude divided by 5 degrees)]. Many GPS receivers, including, for example, GPS receivers used in avionics applications and portable GPS receivers used for recreational and sport applications have limited memory and processing power and therefore cannot quickly and efficiently store and process all 2,592 ionospheric grid point correction elements. Moreover, even for GPS receivers that have sufficient memory to store all the ionospheric grid point correction data, much of the memory required to do so is wasted because only the correction points within a certain distance of a GPS receiver's current location are relevant to the ionospheric conditions at that location.

Accordingly, there exists a need for an improved method and system for receiving ionospheric grid point corrections from WAAS satellites. Moreover, there is a need for such a method and system that benefits from the WAAS data while utilizing a minimal amount of memory and system resources.

SUMMARY OF THE INVENTION

The present invention provides an improved method, system and device for minimizing storage and processing of ionospheric grid point correction data. In accordance with the present invention, a current position of a GPS receiver or other device is determined and a boundary is created based upon the position. Grid point correction data is then obtained only for correction points within the boundary. The collected correction points are used to correct the position initially determined by the GPS receiver.

In another aspect of the invention, a method in a GPS receiver for minimizing storage and processing of ionospheric grid point correction data is provided. According to the method, a current position of a GPS receiver is determined and a boundary is created based on the position. One or more bands and one or more blocks of grid point correction data are analyzed to determine if they are within the boundary. Then, a set of correction points is obtained that are derived from the grid point correction data from correction points within the one or more blocks and the one or more bands surrounding the current position.

In a further aspect of the present invention, a computer-readable medium is provided having stored thereon a data structure for storing ionospheric grid boundaries. The data structure includes a first data field containing data representing a northernmost latitude and a second data field containing data representing a southernmost latitude. The data structure farther includes a third data field containing data representing a number of latitudes in the boundary derived from the northernmost latitude and southernmost latitude. The structure also includes a table containing an entry for each of the boundary latitudes that contains a grid point latitude, an easternmost longitude, a westernmost longitude, a grid point correction array pointer and a number of grid point correction array entries. Finally, the data structure includes a fourth data field containing data representing a total number of grid point correction entries for all latitudes within the boundary.

In still another aspect of the present invention, a computer-readable medium is provided having stored thereon an ionospheric grid point bands data structure. The data structure includes multiple boundary indicator data fields for each grid point band containing data representing an indication that a grid point message within each of the grid point bands should be processed based upon a computed grid boundary. Further, a computer-readable medium is also provided having stored thereon a data structure for storing ionospheric grid point blocks. This data structure includes a grid point block table containing an entry for each of a plurality of possible ionospheric grid point bands. Each band has a plurality of possible grid point blocks and each block within each band contains an indication to process a grid point message based upon a computed grid point boundary.

In yet another aspect of the invention, a computer-readable medium is provided having stored thereon a data structure for storing ionospheric grid point corrections received from a correction message. This data structure includes a first data field containing data representing a grid point longitude and a second data field containing data representing a vertical delay estimate. The structure also has a third data field containing data representing an ionospheric vertical error indicator and a fourth data field containing data representing a reception time of the correction message. The combination of the data fields establish a correction message for a grid point.

Finally, the present invention also provides computer-readable medium having computer-executable modules. The modules include a module for creating a boundary based upon a current position of a user. The boundary is established to determine the grid point correction data to be collected. The modules also include a component for processing the grid point collection data from the WAAS messages.

These and other important aspects of the present invention are described more fully in the detailed description below.

BRIEF DESCRIPTION OF THE DRAWING FIGURES

The objectives and advantages of the present invention will become readily apparent to those skilled in the art from the following detailed description of the drawings, in which:

FIG. 6 is a block diagram of an ionospheric grid boundaries data structure of the present invention;

FIG. 7 is a block diagram of a latitude information array data structure of the present invention;

FIG. 8 is a block diagram of an ionospheric grid point bands data structure of the present invention;

Figure 1:
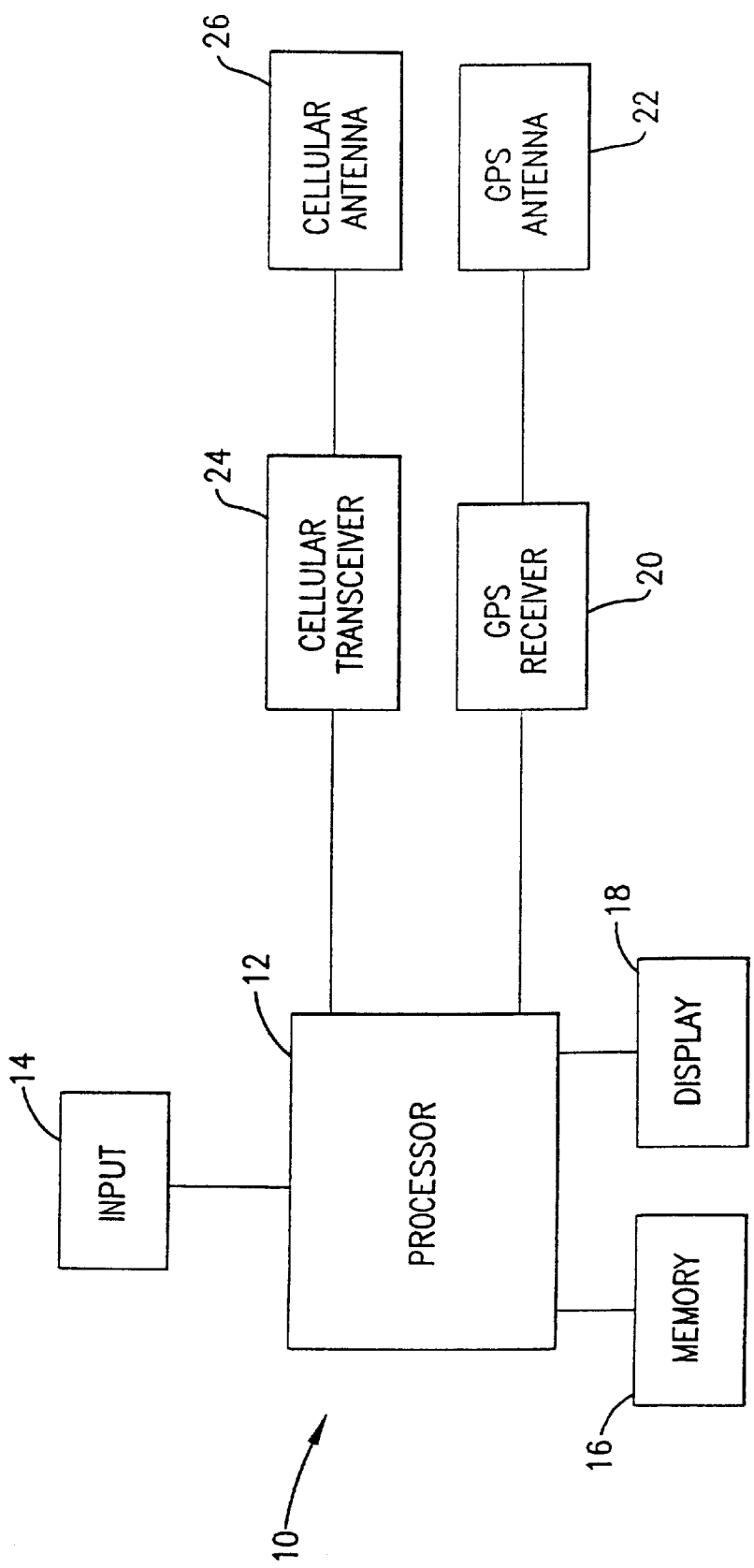
FIG. 1 is a block diagram of a GPS receiver or other device environment suitable for use in implementing the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The present invention provides a method, system, and device for minimizing storage and processing of correction data transmitted from a Spaced Based Augmentation System (SBAS), such as WAAS, European Geostationary Navigation Overlay Service (EGNOS) or MSAS. A preferred embodiment of the present invention is directed to a method, system and device for minimizing storage and processing of ionospheric grid point corrections transmitted from WAAS satellites. It should be understood that the principles of the present invention may be applied to other types of corrections as well.

The present invention may be implemented with and/or incorporated into any global positioning system (GPS) device, including portable, handheld GPS navigation units, GPS-enabled wireless telephones, GPS-enabled personal digital assistants, GPS-enabled laptop computers, avionics equipment that incorporates GPS receivers, marine equipment that incorporates GPS receivers, etc. FIG. 1 illustrates an example of a suitable GPS device 10 for implementing the present invention. The GPS device 10 illustrated and described herein is only one example of a suitable device or environment and is not intended to suggest any limitation as to the scope of use or functionality of the present invention. Neither should the GPS device 10 be interpreted as having any dependency or requirement relating to any one or a combination of components illustrated in this exemplary GPS device 10.

Referring again to FIG. 1, the preferred GPS device 10 includes a processor 12 coupled with an input device 14, memory 16, and a display 18. The processor is further coupled with a GPS receiver 20 that is in turn coupled with a GPS antenna 22. The processor 12 may also be coupled with a cellular phone transceiver 24 and corresponding antenna 26. It will be understood that the input may be any type of input, such as a keypad, switches, touch screen, voice-input (such as a mic), mouse or joystick, etc.

The present invention may also be described in the context of computer-executable instructions, such as program modules, being executed by a computer. Generally, program modules include routines, programs, objects, components, data structures, etc. that perform particular tasks or implement particular abstract data types.

Processor 12 typically accesses at least some form of computer-readable media. Computer-readable media may be any available media that is accessible by the GPS system. By way of example and not limitation, computer-readable media may compromise computer storage media and communications media. Computer storage media includes volatile and non-volatile, removable and non-removable media implemented in any method or technology for storage of information such as computer-readable instructions, data structures, program modules or other data. Communication media specifically embodies computer-readable instructions, data structures, program modules or other data in a modulated data signal such as a carrier wave or transport mechanism and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, RF, infrared and other wireless media. Combinations of any of the above would also be included within the scope of computer-readable media.

Figure 2:
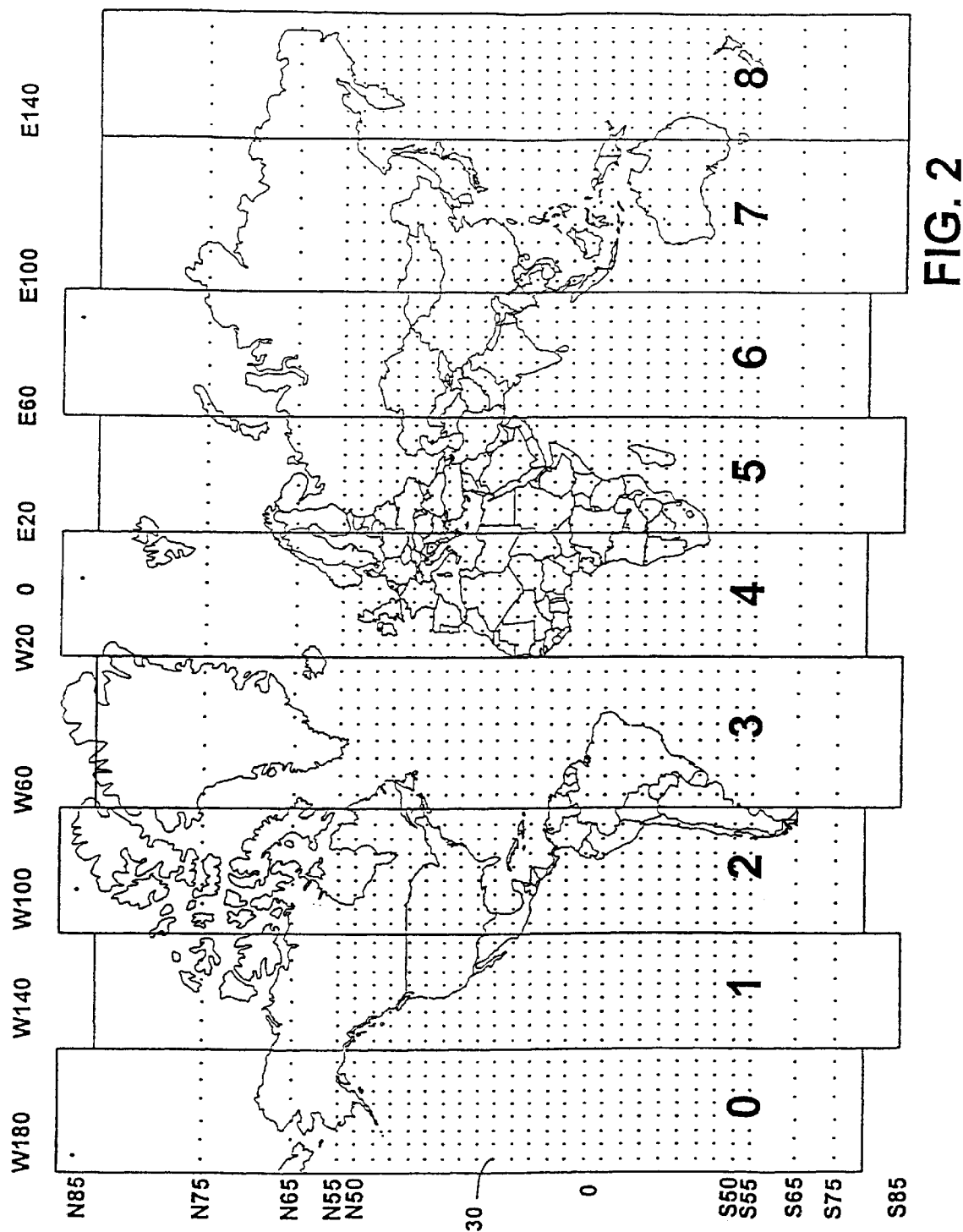
FIG. 2 is global map illustrating the global ionospheric grid point correction locations and associated bands.

As described above, a Wide Area Augmentation System (WAAS) has been implemented to improve GPS accuracy, availability and integrity. WAAS data is transmitted at the same frequency as GPS signals so that GPS receivers including the GPS device 10 may receive WAAS correction messages along with GPS satellite signals. One set of data included in a WAAS correction message is ionospheric correction data. FIG. 2 illustrates a map of WAAS ionospheric grid points for which ionospheric correction data is transmitted. Generally, each grid point 30 is spaced at five degree intervals in both longitude and latitude directions. However, upon approach to the poles of the earth, the grid points become spaced apart at 10, 30, and up to 90 degree intervals. The WAAS satellites each broadcast a mask message (Type 18) and a delay correction message (Type 26). The mask messages define the ionospheric grid point locations that provide the most efficient model of the ionosphere at the time. The WAAS ionospheric grid points are divided into 11 bands numbered from 0 to 10 that allow for efficient broadcasting of correction messages. Each of the bands 0 through 8 illustrated in FIG. 2 covers 40 degrees of longitude. Bands 9 and 10 (not shown) are horizontal bands that cover 25 degrees of latitude and 360 degrees of longitude. In operation, the GPS receiver will receive a transmission from only one band for a particular grid point.

Figure 3:
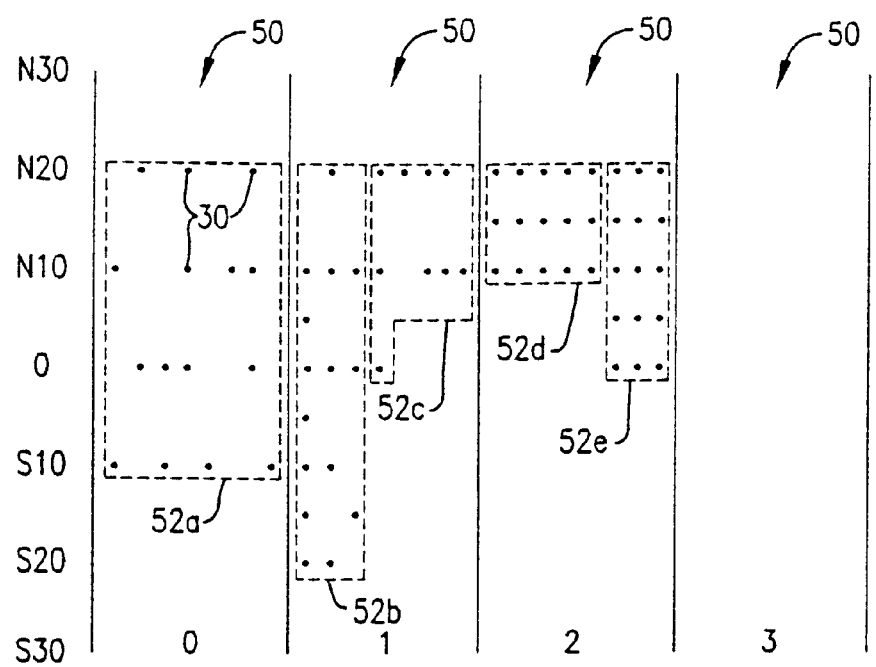
FIG. 3 is a partial view of the map shown in FIG. 2 illustrating the ionospheric grid point locations organized by bands and blocks.
Figure 5:
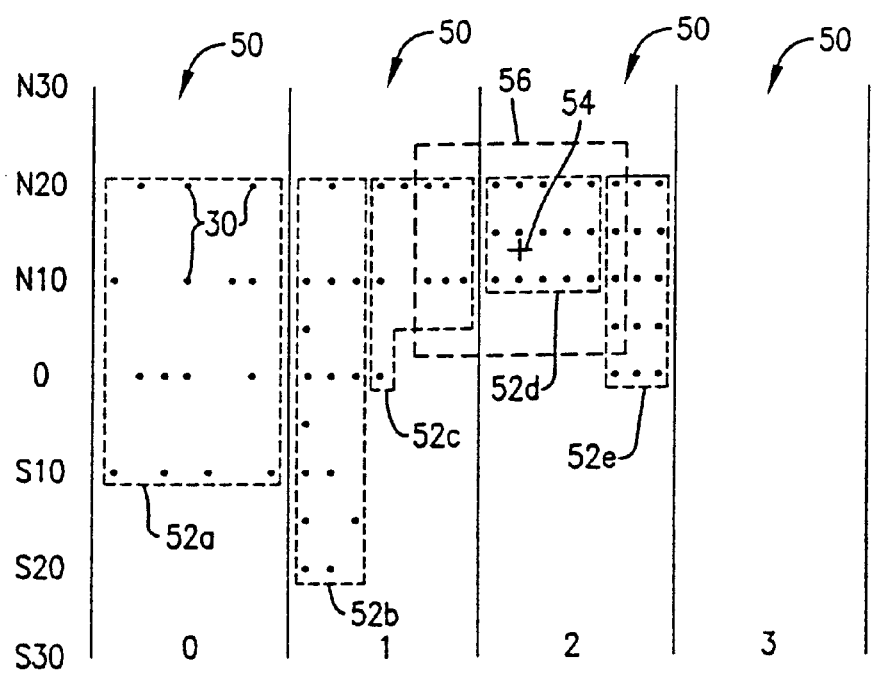
FIG. 5 is a partial view of the map shown in FIG. 2 illustrating a preferred boundary created by the present invention.

As illustrated in FIGS. 3 and 5, the WAAS ionospheric grid points 30 are further divided into blocks 52$a$, $b$, $c$, $d$, $e$ of grid points within the bands 50. Each block 52 may contain up to 15 ionospheric grid points. Each band 50 is therefore divided into a maximum of 14 blocks 52, where each block 52 may contain up to 15 ionospheric grid points 30. Ionospheric grid points 30 are assigned blocks 52 only if the grid point 30 is being broadcast in a correction message. Within bands 0–8, the ionospheric grid points are numbered counting up from the southwest corner (bottom-left) up each longitude column of the band (from south to north) and continuing for each column from west to east (left-to-right) from the bottom of each column. In the mask message, a bit set to 1 indicates that ionospheric correction information is being provided for the associated ionospheric grid point. If the bit is set to 0, no ionospheric correction information is provided for that ionospheric grid point. Thus, as illustrated in FIG. 3, the shape and size of the blocks may vary depending on the grid points that are being broadcast at the time.

The correction messages (Type 26) provide ionospheric delay information for grid points within particular bands 50 and within particular blocks 52 within the bands. FIG. 3 shows a portion of the WAAS correction map of FIG. 2, illustrating correction messages being broadcast within certain bands and blocks. Each correction message contains a band number and a 4-bit block I.D. that indicates the location of the ionospheric grid points 30 in the respective band. The block I.D. indicates to which ionospheric grid point the corrections apply. For example, a first block within a band contains the ionospheric grid point corrections for the first 15 ionospheric grid points designated in the band mask, a second block within the band contains the ionospheric grid point corrections for ionospheric grid points 16–30 designated in the band mask., etc.

The WAAS system and its operation are described in more detail in several versions of documents entitled "Minimum Operational Performance Standards for Global Positioning System/Wide Area Augmentation System Airborne Equipment," RTCA/DO-229, 229A, 229B, and 229C (not published at the time of this writing). These documents are incorporated into the present application by specific reference.

Figure 4:
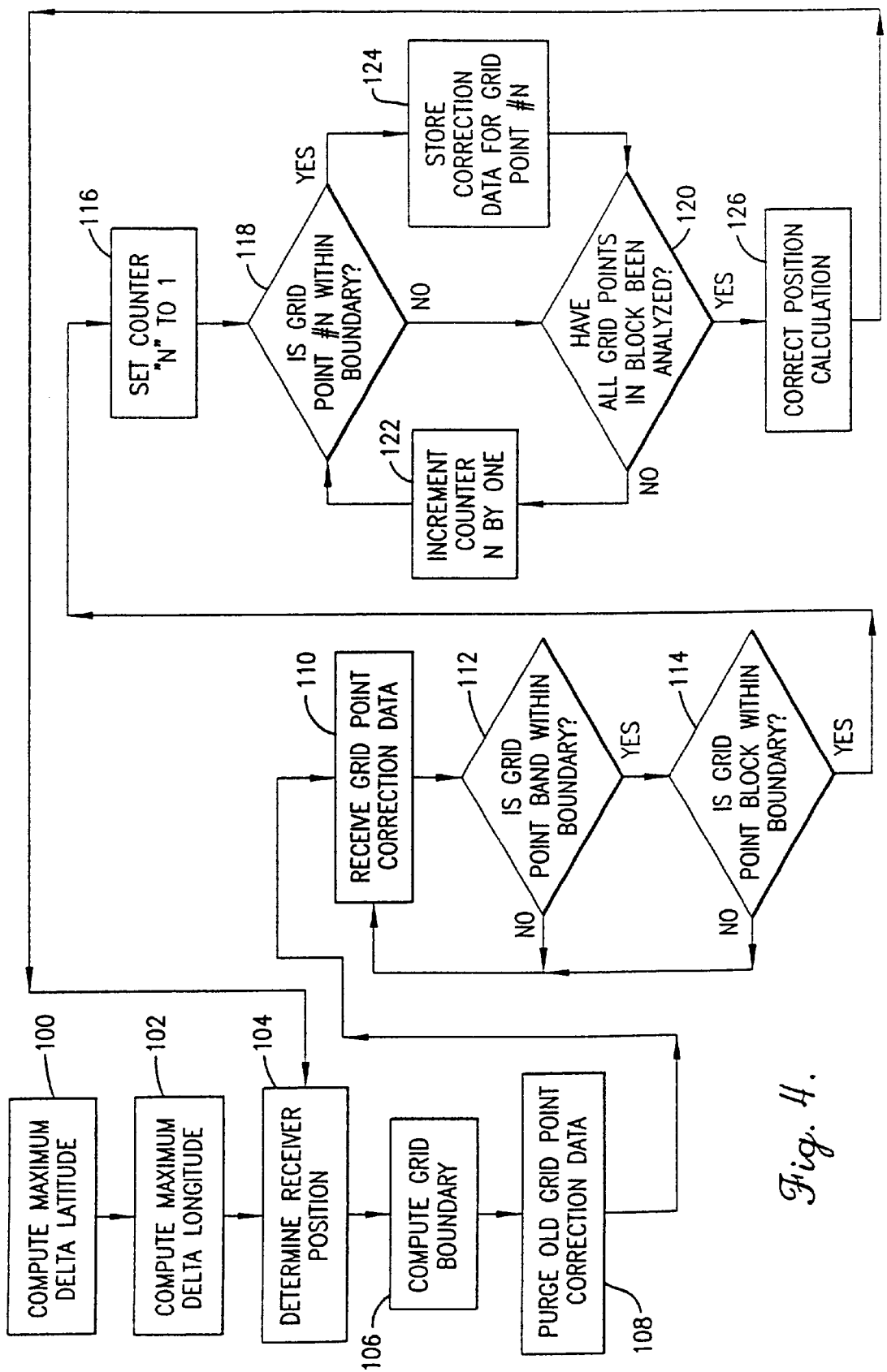
FIG. 4 is a flow diagram illustrating a preferred method for minimizing grid point correction data processed and stored by a GPS receiver or other device.

FIG. 4 is a flow diagram illustrating a preferred method for minimizing grid point correction data according to the present invention. Some of the blocks of the flow diagram may represent a module segment or portion of code of the program modules of the present invention which comprises one or more executable instructions for implementing the specified logical function or functions. In some alternative implementations, the functions noted in the various blocks may occur out of the order depicted in FIG. 4. For example, two blocks shown in succession in FIG. 4 may in fact be executed substantially concurrently, or the blocks may sometimes be executed in the reverse order depending upon the functionality involved.

As discussed above, the present invention determines a boundary around a current position of the GPS device 10 so that the GPS device may collect and analyze grid point correction data only for correction points within the boundary. A boundary is created by first calculating a maximum delta latitude and a maximum delta longitude for all possible latitude positions of the GPS device 10. At step 100 of FIG. 4, the maximum delta latitude to be used in computing the latitude range for the boundary is calculated. The maximum delta latitude is the same for all latitudes, therefore, it can be computed offline and stored in the GPS device 10 as a constant, thus reducing the need for continuous computation. A preferred maximum delta latitude of 18.5620167 degrees is determined using equations (1) and (2) below by setting the satellite elevation (E) and azimuth angle (A) to zero degrees and the user latitude ($\phi_u$) to zero degrees.

$$\phi_{pp} = \sin^{-1}(\sin \phi_u \cos \psi_{pp} + \cos \phi_u \sin \psi_{pp} \cos A)_{radians} \quad (1)$$

$$\psi_{pp} = \frac{\pi}{2} - E - \sin^{-1}\left(\frac{R_e}{R_e + h_I} \cos E\right) \text{ radians} \quad (2)$$

The pierce point latitude ($\phi_{pp}$) is computed using equations (1) and (2) where the earth's central angle ($\psi_{pp}$) is the angle between the user position ($\phi_u$, $\lambda_u$) and the earth projection of the pierce point. The azimuth angle (A) is the angle of the satellite from the user's location ($\phi_u$, $\lambda_u$) measured clockwise for north. The elevation angle (E) is the angle of the satellite from the user's location ($\phi_u$, $\lambda_u$) measured with respect to the local-tangent-plane. $R_e$ is the approximate radius of the earth's ellipsoid (taken to be 6378.1363 km). $h_I$ is the height of the maximum electron density (taken to be equal to 350 km).

Once the maximum delta latitude has been calculated, the maximum delta longitudes for all possible latitudes are calculated in step 102 of FIG. 4. As with the maximum delta latitude, the maximum delta longitudes can be computed offline and stored in the GPS device 10 as a set of constant tables to reduce the need for continuous computation. The maximum delta longitudes are determined using equations (1) and (2) above and equations (3) and (4) as shown below are used to calculate the longitude pierce point ($\lambda_{pp}$).

If $\phi_u > 70°$, and tan $\psi_{pp}$ cos $A$ > tan($\pi/2 - \phi_u$) (3)

or if $\phi_u < -70°$, and $-\tan \psi_{pp}$ cos $A$ > tan($\pi/2 + \phi_u$)

then $$\lambda_{pp} = \lambda_u + \pi - \sin^{-1}\left(\frac{\sin\psi_{pp}\sin A}{\cos\phi_{pp}}\right) \text{ radians} \quad (3)$$

Otherwise:

$$\lambda_{pp} = \lambda_u + \sin^{-1}\left(\frac{\sin\psi_{pp}\sin A}{\cos\phi_{pp}}\right) \text{ radians,} \quad (4)$$

where $A$ is the azimuth angle of the satellite from the user's location ($\phi_u$, $\lambda_u$) measured clockwise from north.

Special considerations are involved when computing the maximum delta longitude. For example, at latitudes near the poles, a satellite's pierce point may be on the other side of the earth from the user's current position. Thus, the maximum delta longitude is actually set so that the receiver will collect all 360 degrees of longitude data for certain latitudes.

Once the latitude and longitude tables are established and set up, the current position or location of the GPS device 10 is determined in step 104. The position of the GPS device 10 is initially determined in a conventional manner by acquiring and analyzing signals from three or more GPS satellites. An exemplary current position of the GPS device 10 is referenced by the numeral 54 in FIG. 5.

A boundary around the current position of the GPS device 10 is then determined in step 106 based on the maximum delta latitude and longitude(s) associated with that position. FIG. 5 illustrates an exemplary boundary 56 around the current position 54 of the GPS device 10.

Figure 11:
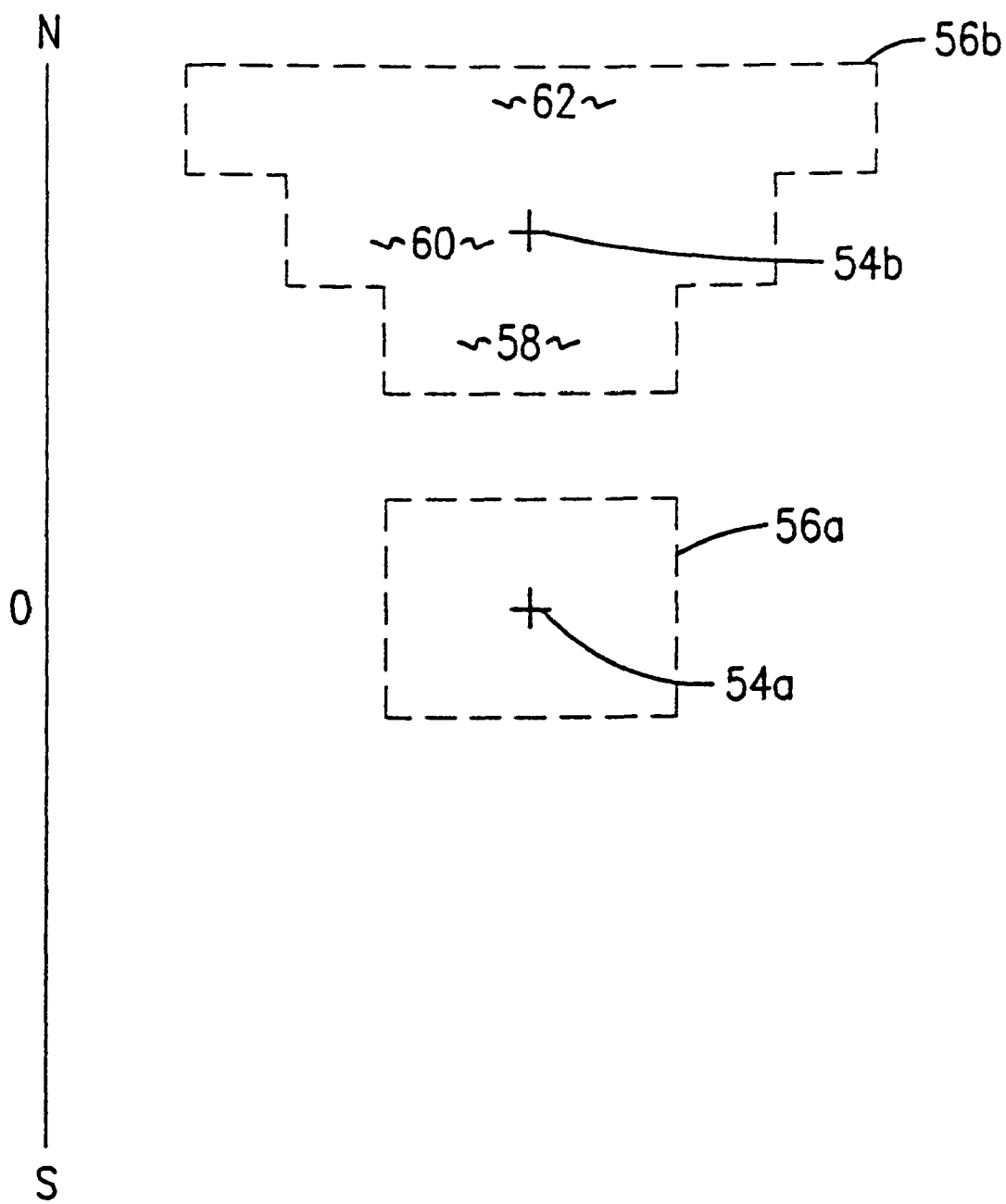
FIG. 11 illustrates several boundaries that may be created by the present invention.

Consideration must be given to ensure that the computed boundary 56 represents the data actually transmitted by the WAAS satellites. For example, for locations near the earth's equator, the grid points are generally spaced at five degree intervals in both latitude and longitude directions. Thus, a boundary 56a around a position 54a near the equator will have a delta latitude and delta longitude that are equal as illustrated in FIG. 11. However, certain areas of the earth have grid points with latitude spaced at 10 degree intervals and longitude spaced at 10, 30, and 90 degree intervals. Thus, in some instances, and particularly when the GPS device 10 is nearer a pole of the Earth, a boundary 56b will take the general form of that illustrated in FIG. 11. In this regard, the boundary 56b takes into account converging longitudes corresponding to increased proximity to the poles, the curvature of the Earth, and the current presentation of points on the WAAS grid. As illustrated, the boundary 56b comprises a plurality of step-portions. The step-portion closest to the equator has a first associated delta longitude, and each longitudinal step-portion closer to the pole has a corresponding delta longitude that is equal to or greater than the delta longitude associated with the immediately preceding step-portion. In particular, as illustrated, step-portion 58, which is the closest to the equator, has a corresponding delta longitude of x degrees. Step-portion 60, which is one step of the boundary closer to the pole, has a corresponding delta longitude y, where y is greater than or equal to x. Similarly, step portion 62, which is one more step of the boundary closer to the pole, has a corresponding delta longitude z, where z is greater than or equal to y.

Once a new boundary 56 is computed, the GPS device 10 purges previously collected correction data now lying outside the new boundary to ensure storage slots are available for corrections collected within the new boundary as depicted in step 108. The GPS device 10 then begins to analyze the new grid point correction data transmitted from the WAAS satellites to determine if the data corresponds to grid points within the boundary 56 as shown in step 110. Messages containing ionospheric grid point data outside of the boundary 56 are ignored and messages containing data within the boundary are stored in the GPS device 10.

The preferred method of the present invention determines whether a correction message contains correction data for bands and blocks within the boundary to quickly minimize the number of grid point corrections that must be analyzed. Particularly, step 112 first determines if a received correction message contains correction data for a band 50 within the boundary 56. If it does not, the correction data in the message is ignored and the method returns to step 110 to await further correction messages.

If, however, the message does contain correction data for a band 50 within the boundary 56, the method proceeds to step 114 to determine if the message contains correction data for a block 52 within the boundary 56. If it does not, the message is ignored and the method once again returns to step 110.

If, however, the message does contain grid point corrections for a block 52 within the boundary 56, the method next determines, for each grid point correction 30 within the block, whether that grid point correction 30 is within the boundary 56. To do so, a counter "N" is first set to 1 as shown in step 116. Step 118 then determines if grid point number N is within the boundary 56. If it is not, the grid point correction N is ignored and the method proceeds to step 120 to determine if all of the grid points in the block have been analyzed. If they have not, step 122 increments N by 1 and returns to step 118 to determine if the next grid point is within the boundary.

Steps 118, 120, and 122 are repeated until a grid point correction is found to be within the boundary 56. Step 124 then stores the correction data for the grid point in the memory of the GPS. The method then returns to step 120 to once again determine if all grid points in the block have been analyzed. If they have not, step 122 again increments N by 1 and returns to step 118 to determine if the next grid point is within the boundary. For example, FIG. 5 illustrates a boundary 56 that includes grid point corrections in Bands 1 and 2 and blocks 52c, d, e. These grid point corrections are stored in the GPS device 10 and analyzed.

Once all of the grid points in the block have been analyzed, step 126 uses the grid point correction data that was saved in step 124 to compensate for errors in the position of the GPS device that was originally calculated in step 104. One such method of doing so is set forth in Appendix A of the RTCA document referenced above. Following step 126, processing returns to step 104 and awaits the next available position reading.

Because GPS devices are typically used to track the location of aircraft, marine vessels, motor vehicles and other moving objects, the method periodically must return to step 100 to recalculate the boundary 56 based on the most recent position of the GPS device. GPS devices typically move slowly relative to the frequency of the messages transmitted from the WAAS satellites; therefore, the new grid boundary may be computed relatively infrequently (e.g. once every minute) and still meet the system dynamics associated with changing satellite positions.

The table-driven method described above for minimizing the number of ionospheric grid point corrections is preferably implemented utilizing data structures as illustrated in FIGS. 6–10. FIG. 6 illustrates an ionospheric grid boundaries data structure 200. The data structure 200 includes a northernmost latitude boundary 202, a southernmost latitude boundary 204, and a number of latitudes 206 within the northernmost and southernmost latitude boundary. Additionally, grid boundary data structure 200 further includes a latitude information array 208 for up to 11 latitudes and the total number of grid correction array entries 210. The latitude information array 208 is further described in a latitude information array data structure 212 illustrated in FIG. 7. For each latitude, the latitude information array 212 includes a grid point latitude 214, an easternmost longitude 216, and a westernmost longitude 218 as determined by the boundary computation 102, 104. Also contained within the latitude information array 212 is a grid correction array index 220 that marks the first correction at this latitude. Additionally, a number of grid point correction array entries 222 is stored for this latitude.

Figure 9:
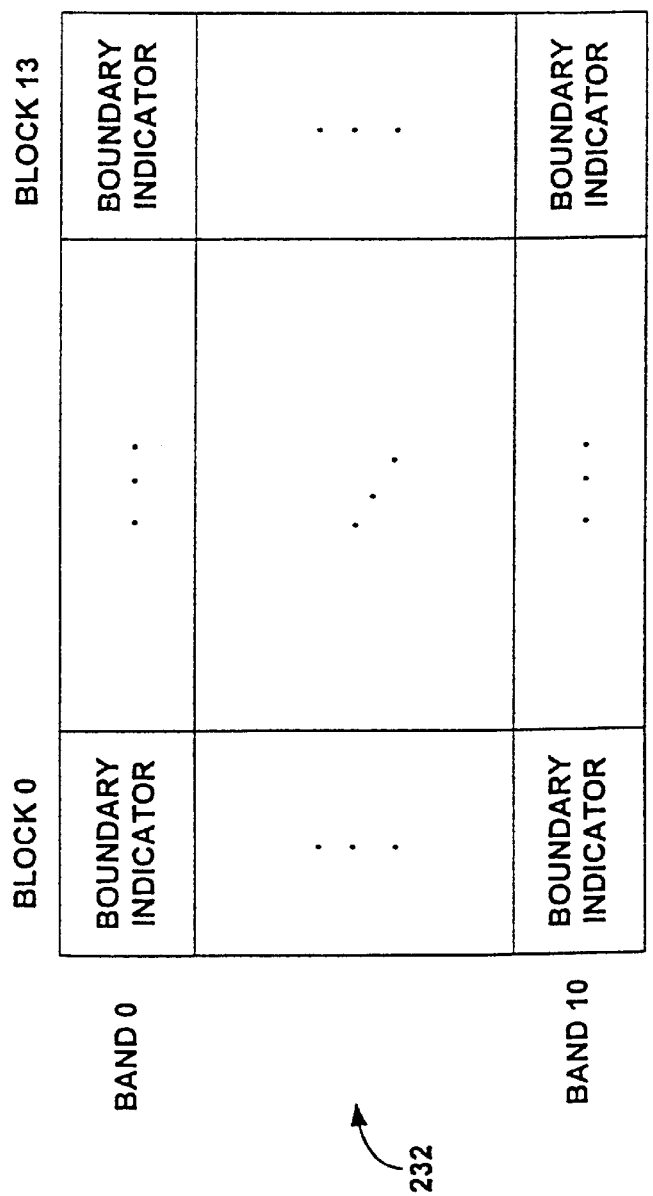
FIG. 9 is a block diagram of an ionospheric grid point blocks data structure of the present invention.

When determining the appropriate grid points to utilize within the boundary, an ionospheric grid point bands data structure 224 (FIG. 8) and an ionospheric grid point blocks data structure 232 (FIG. 9) are utilized by the system to ensure the efficient gathering of the correction data. As illustrated in FIG. 8, ionospheric grid point bands data structure 224 contains boundary indicators 226–230 for bands 0 through 10 indicating that the correction message should be processed based upon the computed grid boundary. In other words, if a particular band is not within the boundary, correction data within that band will not be utilized. The system then looks to an ionospheric grid point blocks data structure 232 illustrated in FIG. 9 to determine if a grid point message should be processed within a given block. As illustrated in FIG. 9, bands 0 through 10 each contain up to 14 blocks (Block 0 to Block 13). As shown in the two-dimensional array, an indication is recorded for each block within each band to determine if the correction message should be processed based upon the computed grid boundary.

Figure 10:
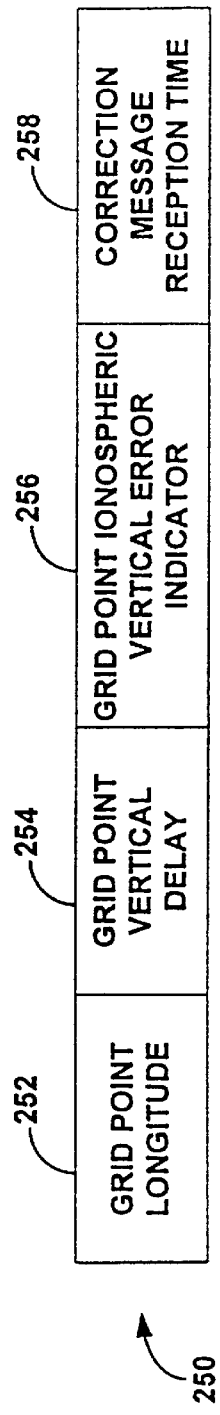
FIG. 10 is a block diagram of an ionospheric grid point correction array data structure of the present invention.

Upon the creation of the boundary and the isolation of the data within the appropriate blocks within each band, the grid point correction data is stored in an ionospheric grid correction array data structure 250 as illustrated in FIG. 10. This correction array data structure 250 contains the grid point longitude 252 as determined from the WAAS correction message, a grid point vertical delay estimate 254 from the WAAS correction message, and a grid point ionospheric vertical error indicator 256 also from the WAAS correction message. The grid correction array data structure 250 also contains the correction message reception time 258 that is utilized to timeout the ionospheric correction messages when it no longer can be applied to correct the user's position.

From the foregoing, it will be seen that this invention is one well adapted to attain all the ends and objects herein above set forth, together with other advantages which are obvious and which are inherent to the invention. It will be understood that certain features and subcombinations are of utility and may be employed without reference to other features and subcombinations. This is contemplated by and is within the scope of the claims. Since many possible embodiments may be made of the invention without departing from the scope thereof, it is understood that all matters herein set forth or shown in the accompanying drawings are to be interpreted as illustrative and not in a limiting sense.

What is claimed is:

1. A method in a global positioning system for minimizing storage and processing of ionospheric grid point correction data, the method comprising:
   determining a current position;
   creating a boundary based upon the current position; and
   obtaining grid point correction data corresponding to correction points within the boundary.

2. The method as recited in claim 1, wherein determining a current position includes receiving a global positioning system signal at a global positioning receiver.

3. The method as recited in claim 2, wherein the global positioning receiver is a portable, handheld global positioning receiver unit.

4. The method as recited in claim 1, wherein creating a boundary includes establishing a maximum delta latitude.

5. The method as recited in claim 4, wherein creating a boundary includes establishing a maximum delta longitude.

6. The method as recited in claim 1, wherein the grid point correction data is organized by bands and blocks.

7. The method as recited in claim 6, wherein obtaining grid point correction data includes determining the bands within the boundary.

8. The method as recited in claim 7, wherein obtaining grid point correction data includes determining the blocks within the boundary.

9. The method as recited in claim 8, wherein obtaining grid point correction data includes determining grid point correction points within the boundary.

10. A computer-readable medium having computer-executable instructions for performing the method recited in claim 1.

11. A computer system having a processor, a memory, and an operating environment, the computer system operable to execute the method recited in claim 1.

12. A method in a global positioning system for minimizing storage and processing of ionospheric grid point correction data, the method comprising:
    determining a current position;
    determining one or more bands and one or more blocks based upon the current position; and
    obtaining a set of correction points, wherein the set is derived from the grid point correction data corresponding to correction points within the one or more blocks and the one or more bands surrounding the current position.

13. The method as recited in claim 12, wherein determining a current position includes receiving a global positioning system signal at a global positioning receiver.

14. The method as recited in claim 13, wherein the global positioning receiver is a portable, handheld global positioning receiver unit.

15. The method as recited in claim 12, wherein the set of correction points establishes a boundary.

16. The method as recited in claim 15, wherein the boundary has a maximum delta latitude.

17. The method as recited in claim 16, wherein the boundary has a maximum delta longitude.

18. A computer-readable medium having computer-executable instructions for performing the method recited in claim 12.

19. A computer-readable medium having data stored thereon a data structure for storing ionospheric grid boundaries comprising:
- a first data field containing data representing a northernmost latitude;
- a second data field containing data representing a southernmost latitude;
- a third data field containing data representing a number of latitudes in the boundary, wherein the number of boundary latitudes is derived from the northernmost latitude and southernmost latitude;
- a table containing an entry for each of the boundary latitudes, wherein each entry contains a grid point latitude, an easternmost longitude, a westernmost longitude, a grid point correction array pointer and a number of grid point correction array entries; and
- a fourth data field containing data representing a total number of grid point correction entries for all latitudes within the boundary.

20. The computer-readable medium in claim 19, wherein the grid point correction pointer establishes the first grid point correction at the grid point latitude.

21. A computer-readable medium having data stored thereon an ionospheric grid point bands data structure, comprising:
- multiple boundary indicator data fields for each grid point band containing data representing an indication that a grid point correction message within each of the grid point bands should be processed based upon a computed grid boundary.

22. A computer-readable medium having data stored thereon a data structure for storing ionospheric grid point blocks comprising:
- a grid point block table containing an entry for each of a plurality of possible ionospheric grid point bands, wherein each band has a plurality of possible grid point blocks and, wherein each block within each band contains an indication to process a grid point correction message based upon a computed grid point boundary.

23. A computer-readable medium having data stored thereon a data structure for storing ionospheric grid point corrections received from a grid point correction message, comprising:
- a first data field containing data representing a grid point longitude;
- a second data field containing data representing a vertical delay estimate;
- a third data field containing data representing an ionospheric vertical error indicator; and
- a fourth data field containing data representing a reception time of the correction message,
- wherein the data fields establish a correction message for a grid point.

24. A method in a global positioning system for minimizing storage and processing of ionospheric grid point correction data, the method comprising:
- determining a current position;
- creating a boundary based upon the current position;
- obtaining grid point correction data corresponding to correction points within the boundary; and
- implementing the foregoing steps in a portable, hand-held navigation device.

25. The method as recited in claim 24, wherein determining a current position includes receiving a global positioning signal at a global positioning receiver.

26. The method as recited in claim 24, wherein creating a boundary includes establishing a maximum delta latitude.

27. The method as recited in claim 24, wherein creating a boundary includes establishing a maximum delta longitude.

28. The method as recited in claim 24, wherein the grid point correction data is organized by bands and blocks.

29. The method as recited in claim 28, wherein obtaining grid point correction data includes determining the bands within the boundary.

30. The method as recited in claim 29, wherein obtaining grid point correction data includes determining the blocks within the boundary.

31. The method as recited in claim 30, wherein obtaining grid point correction data includes determining grid point correction points within the boundary.

* * * * *